(12) United States Patent
Fujimoto (10) Patent No.: US 6,532,816 B2
(45) Date of Patent: Mar. 18, 2003

(54) VIBRATING GYROSCOPE AND ELECTRONIC APPARATUS INCORPORATING THE SAME

(75) Inventor: Katsumi Fujimoto, Kaminiikawa-gun (JP)

(73) Assignee: Murata Manufacturing Co., Ltd.

( * ) Notice: Subject to any disclaimer, the term of this patent is extended or adjusted under 35 U.S.C. 154(b) by 20 days.

(21) Appl. No.: 09/779,264

(22) Filed: Feb. 8, 2001

(65) Prior Publication Data

US 2001/0013251 A1 Aug. 16, 2001

(30) Foreign Application Priority Data

Feb. 15, 2000 (JP) ........................... 2000-036886

(51) Int. Cl.⁷ ............................................... G01P 9/04
(52) U.S. Cl. .................... 73/504.14; 73/504.12
(58) Field of Search ................... 73/504.12, 504.14, 73/504.15, 504.16, 504.04; 310/329, 331

(56) References Cited

U.S. PATENT DOCUMENTS

| 5,635,641 | A | * | 6/1997 | Kakehi et al. | ........... 73/504.14 |
|---|---|---|---|---|---|
| 5,635,647 | A | * | 6/1997 | Heinouchi | ............... 73/504.12 |
| 5,794,080 | A | * | 8/1998 | Watanabe et al. | ......... 73/504.12 |
| 5,874,674 | A | * | 2/1999 | Kasanami et al. | ........ 73/504.14 |
| 5,895,999 | A | * | 4/1999 | Okaguchi et al. | ........ 73/504.14 |
| 5,970,792 | A | * | 10/1999 | Yamamoto | ............... 73/504.14 |

FOREIGN PATENT DOCUMENTS

| JP | 08-178671 | 7/1996 |
|---|---|---|
| JP | 09159455 | 6/1997 |
| JP | 10332379 | 12/1998 |

* cited by examiner

*Primary Examiner*—Helen Kwok
(74) *Attorney, Agent, or Firm*—Keating & Bennett, LLP (57) ABSTRACT

A vibrating gyroscope includes a substrate, a vibrator and supporting members fixed in proximity to the node points on both principal planes of said vibrator. The supporting members include first portions extending in a direction parallel to the substrate from the principal planes of the vibrator, and second portions extending in a direction orthogonal to the substrate, the second portions being fixed to the substrate.

14 Claims, 10 Drawing Sheets

FIG. 11 PRIOR ART ated electrode 103. Furthermore,
VIBRATING GYROSCOPE AND ELECTRONIC APPARATUS INCORPORATING THE SAME

BACKGROUND OF THE INVENTION

1. Field of the Invention

The present invention relates to vibrating gyroscopes and electronic apparatuses incorporating the same, and more specifically, it relates to a vibrating gyroscope for use in video cameras with image stabilization capabilities, car navigation systems, pointing devices, etc., and to an electronic apparatus incorporating the same.

2. Description of the Related Art

Figure 10:
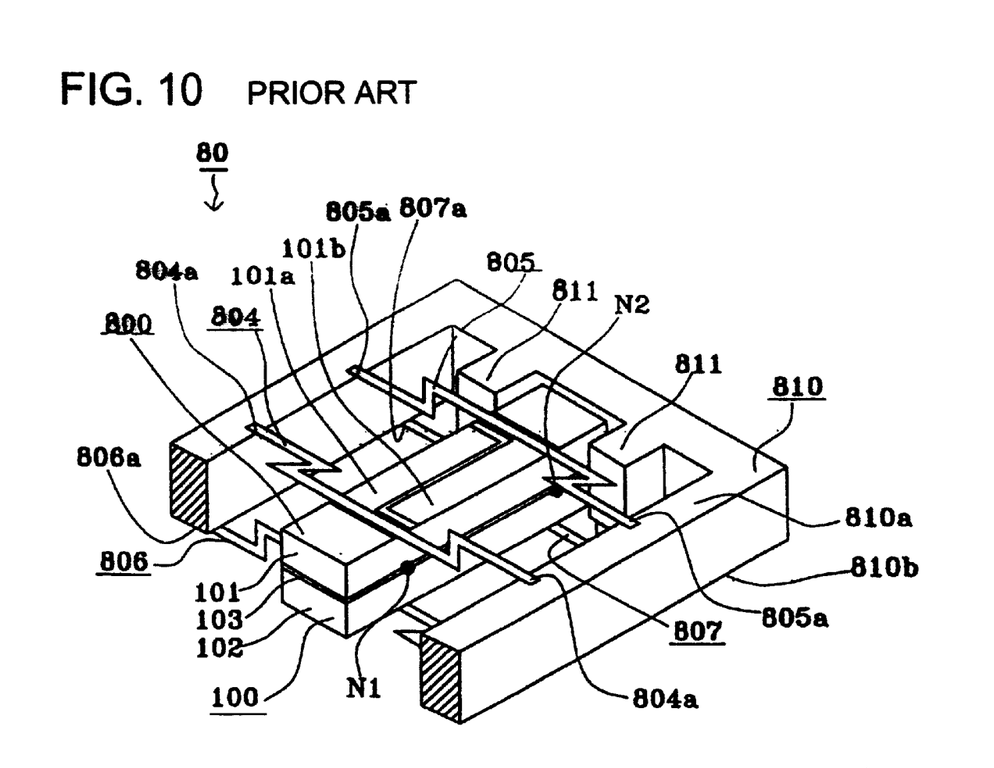
FIG. 10 is a fragmentary perspective view of a conventional vibrating gyroscope.

FIG. 10 is a fragmentary perspective view of a conventional vibrating gyroscope. The principles of the vibrating gyroscope 80 shown in FIG. 10 are disclosed in Japanese Unexamined Patent Application Publication No. 10-332379.

Referring to FIG. 10, the vibrating gyroscope 80 includes a vibrator 100, supporting members 804, 805, 806, and 807, and a frame 810. The vibrator 100 includes a first piezoelectric substrate 101 polarized in the thickness direction, a first detecting electrode 101a and a second detecting electrode 101b being formed on a first principal plane thereof, and a second piezoelectric substrate 102 polarized in the thickness direction, a driving electrode (not shown) being formed on a first principal plane thereof. A second principal plane of the first piezoelectric substrate 101 and a second principal plane of the second piezoelectric substrate 102 are laminated via an intermediary electrode 103. Furthermore, the supporting members 804 and 805 are provided at the positions where node points N1 and N2 of the vibrator 100 are projected on the first principal plane of the first piezoelectric substrate 101, and the supporting members 806 and 807 are provided at the positions where the node points N1 and N2 are projected on the first principal plane of the second piezoelectric substrate 102. The first detecting electrode 101a is connected to the supporting member 804, the second detecting electrode 101b is connected to the supporting member 805, and the driving electrode on the first principal plane of the second piezoelectric substrate 102 is connected to the supporting members 806 and 807. The supporting members 804, 805, 806, and 807 are composed of the same material, are constructed in the same shape, and have the same stiffness, and support the piezoelectric substrates 101 and 102 while also serving as leads.

The frame 810 is composed of an insulating material such as resin, and has an upper face 810a on the same plane as the first principal plane of the first piezoelectric substrate 101, a lower face 810b on the same plane as the first principal plane of the second piezoelectric substrate 102, and projections 811 provided on an inner face of the frame 810 with a particular spacing along the width direction of the vibrator 100. Ends 804a, 805a, 806a, and 807a of the supporting members 804, 805, 806, and 807 extend in a direction parallel to the first principal plane of the first piezoelectric substrate 101 or the first principal plane of the second piezoelectric substrate 102. The ends 804a and 805b are fixed to the upper face 810a of the frame 810, for example, by soldering, and the ends 806a and 807a are fixed to the lower face 810b of the frame 810, for example, by soldering.

Generally, a vibrating gyroscope requires thick supporting members in order to prevent problems such as the vibrator falling off from the supporting members due to an excessive shock exerted on the vibrating gyroscope. Use of thick supporting members, however, causes the vibration of the vibrator to leak from the supporting members, reducing the magnitude of the vibration.

In the vibrating gyroscope 80, thin supporting members 804 and 806 are provided so as to sandwich the node point N1, and thin supporting members 805 and 807 are provided so as to sandwich the node point N2, and the supporting members 804, 805, 806, and 807 are fixed to the substrate 810 having the same thickness as the piezoelectric substrates 101 and 102. Thus, although supported by the thin supporting members 804, 805, 806, and 807, the vibrator 100 avoids problems such as falling off from the supporting members 804, 805, 806, and 807.

In the vibrating gyroscope 80 so constructed, when a driving signal is applied to the driving electrode on the first principal plane of the second piezoelectric substrate 102 via the supporting members 806 and 807, longitudinal-bar flexural oscillation occurs in the thickness direction of the vibrator 100, in which the nodes in the lowest mode are the node points N1 and N2. When an angular velocity, for which the longitudinal direction of the vibrator 100 is the axis, is applied to the vibrating gyroscope 80, the vibrator 100 is flexed in the width direction, and signals output from the first detecting electrode 101 a and the second detecting electrode 101b are processed, so that the angular velocity applied to the vibrating gyroscope is determined.

Furthermore, in the vibrating gyroscope 80, the projections 811 are provided with a particular spacing along the width direction of the vibrator 100, so that excessive displacement of the vibrator 100 and plastic deformation of the supporting members 804, 805, 806, and 807 are prevented even if an excessive shock in the width direction of the vibrator 100 is exerted on the vibrating gyroscope 80.

Figure 11:
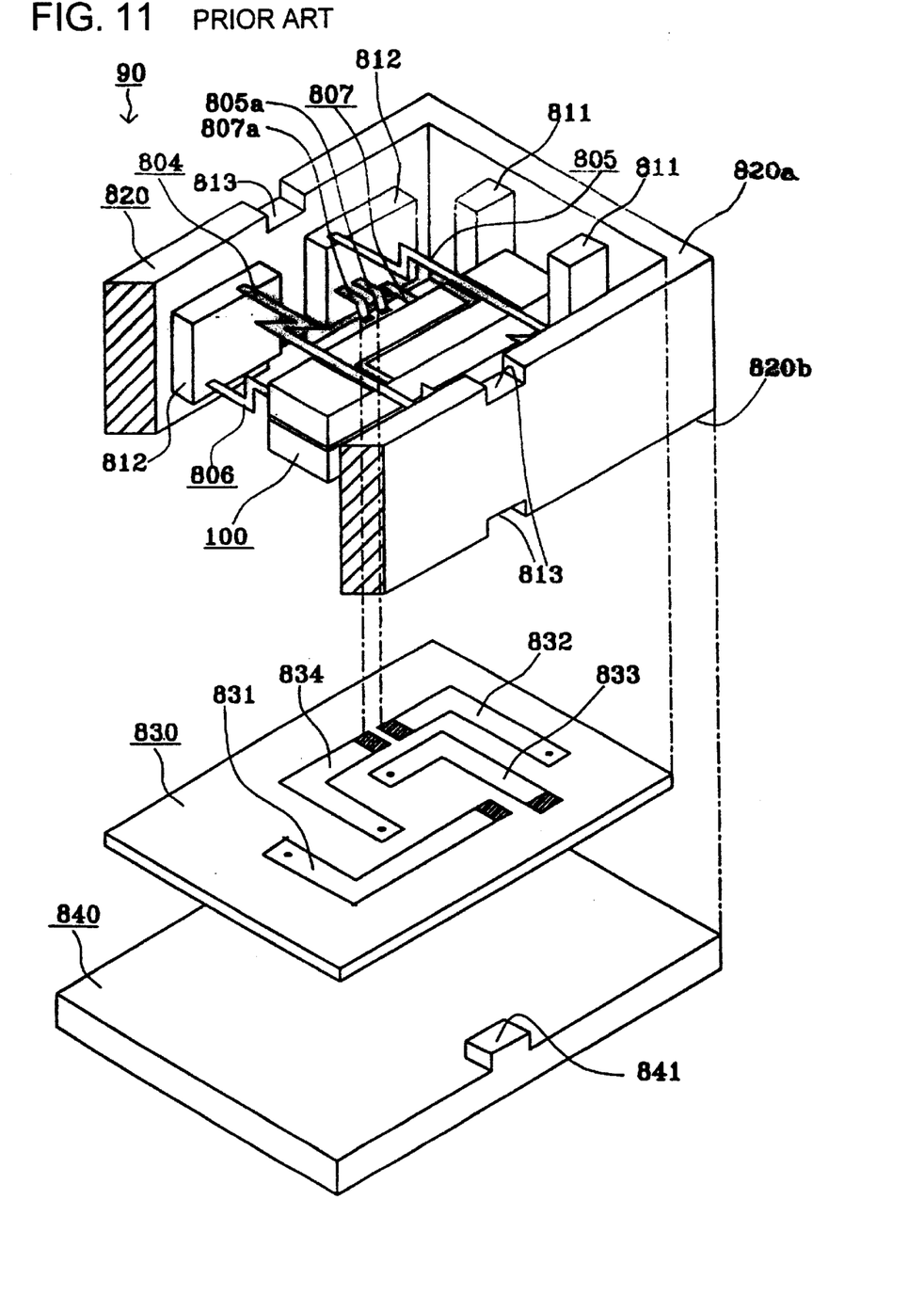
FIG. 11 is a fragmentary exploded perspective view of another conventional vibrating gyroscope.

Next, FIG. 11 is a fragmentary exploded perspective view of another conventional vibrating gyroscope. In FIG. 11, components identical to or equivalent to those in the vibrating gyroscope 80 shown in FIG. 10 are indicated by the same reference characters, and description thereof is omitted.

Referring to FIG. 11, a vibrating gyroscope 90 includes a frame 820 instead of the frame 810 in the vibrating gyroscope 80, a substrate 830 (not shown in FIG. 10), a lower lid 840, and an upper lid (not shown) having the same construction as the lower lid 840.

The frame 820 is composed of resin, and includes an upper face 820a on a plane above a first principal plane of a first piezoelectric substrate 101, a lower face 820b on a plane below a first principal plane of a second piezoelectric substrate 102, and in addition, convex portions 812 provided on inner faces of the frame 820, and concave slots 813 provided on the upper face 820a and the lower face 820b of the frame 820. Supporting members 804 and 805 are led into the frame 820 from the top faces of the convex portions 812, supporting members 806 and 807 are led into the frame 820 from side faces of the convex portions 812, and ends 805a and 807a and ends 804a and 806a (not shown) of the supporting members 804, 805, 806, and 807 are pulled out from side faces of the convex portions 812.

The substrate is provided with lands 831, 832, 833, and 834 formed on the top face thereof, and electronic components mounted on the bottom face thereof, necessary for driving a vibrator 100 (not shown) or for determining angular velocity. The substrate 830 is fixed to the frame 820 so as to engage with the bottom faces of the convex portions 812 and with the inner faces of the frame 820. The ends 804a, 805a, 806a, and 807a of the supporting members 804, 805, 806, and 807 are connected to the lands 831, 832, 833, and 834. The upper lid and the lower lid 840 are composed of resin, and are provided with third projections 841. The upper lid and the lower lid 840 are fixed to the frame 820 so that the third projections 841 and the concave slots 813 of the frame 820 engage with each other.

In the vibrating gyroscope 90, the vibrator 100 is fixed to the frame 820 and the substrate 830 is also fixed to the frame 820, so that the vibrator 100, the frame 820, and the substrate 830 are integrated. Furthermore, the upper lid and the lower lid 840 are provided so as to seal the electronic components mounted on the substrate 830, electrically shielding the electronic components from the outside.

In the conventional vibrating gyroscope 80, thin supporting members 804, 805, 806, and 807 are provided so as to sandwich the node points N1 and N2 of the vibrator 100, and are fixed to the frame 810 having the same thickness as the piezoelectric substrates 101 and 102. Thus, there is no problem that the vibration of the vibrator 100 will be damped, and even if thin supporting members are used, problems such as the vibrator 100 falling off from the supporting members 804, 805, 806, and 807 are unlikely.

In the conventional vibrating gyroscope 80 shown in FIG. 10, however, there is a problem that the number of parts is increased because the frame 810 is included.

Furthermore, if the supporting members 804, 805, 806, and 807 are fixed to the frame 810 using solder, friction occurs between the supporting members 804, 805, 806, and 807 and the frame 810 in proximity to the ends 804a, 805a, 806a, and 807a that were fixed using solder, the friction causing a problem that the vibration of the vibrator 100 is disturbed.

Furthermore, in the conventional vibrating gyroscope 90 shown in FIG. 11, when the vibrator 100 and the substrate 830 are integrated, the frame 820 composed of resin is included, causing a problem that the overall size of the vibrating gyroscope is increased.

In particular, if the area of the entire vibrating gyroscope is determined in product specifications, the area of the substrate 830 is restricted and the need arises to mount the vibrator 100 and required electronic components on the top face and the bottom face of the substrate 830, causing a problem in the increased height of the overall vibrating gyroscope. Furthermore, when the electronic components are mounted on the bottom face of the substrate 130, the lower lid 840 must be provided in order to seal in the electronic components, causing the problems in the further increase height of the overall vibrating gyroscope and an increase in the number of parts.

Furthermore, the manufacturing process for three-dimensionally constructing the frame 820 and the supporting members 804, 805, 806, and 807 is very complex, causing a problem of laborious production.

SUMMARY OF THE INVENTION

Accordingly, it is an object of the present invention to provide a vibrating gyroscope in which the number of parts is reduced.

It is another object of the present invention to provide a vibrating gyroscope in which the a real size and the height are reduced.

It is still another object of the present invention to provide an electronic apparatus in which the cost and size are reduced owing to a reduction in the number of parts and smaller size of the vibrating gyroscope.

In order to achieve the above objects, a vibrating gyroscope according to the present invention comprises a substrate, a vibrator, and supporting members fixed in proximity to the node points on both principal planes of the vibrator. The supporting members comprise first portions extending in a direction parallel to the substrate from the principal planes of the vibrator, and second portions extending in a direction orthogonal to the substrate, the second portions being fixed to the substrate.

The vibrating gyroscope according to the present invention is also characterized in that the second portions are disposed in proximity to the vibrator, and in that the second portions inhibit excessive displacement of the vibrator when the vibrator is excessively displaced.

The vibrating gyroscope according to the present invention is also characterized in that the second portions comprise projections, which are disposed in proximity to the vibrator and which inhibit excessive displacement of the vibrator when the vibrator is excessively displaced.

The vibrating gyroscope according to the present invention is also characterized in that the second portions comprise bent portions bent back in a direction orthogonal to the substrate.

The vibrating gyroscope according to the present invention is also characterized in that the supporting members are composed of a hard elastic material.

The vibrating gyroscope according to the present invention is also characterized in that it includes driving means for vibrating the vibrator, and detecting means for detecting an output generated by the vibrator.

The vibrating gyroscope according to the present invention is also characterized in that electronic components are mounted on the substrate only on the face on which the vibrator is mounted, and in that a case is fixed on the substrate so as to cover the vibrator and the electronic components.

The vibrating gyroscope according to the present invention is also characterized in that the substrate comprises through holes at the ends thereof.

An electronic apparatus according to the present invention is characterized by comprising the vibrating gyroscope.

In the vibrating gyroscope according to the present invention, the vibrator is supported by being sandwiched from above and below the node points N1 and N2, so that the vibration of the vibrator is inhibited from leaking from the supporting members, and so that the vibrator is inhibited from falling off from the supporting members even if an excessive shock is exerted thereon.

Furthermore, in the vibrating gyroscope according to the present invention, the second portions are provided in proximity to the vibrator, so that the supporting members are not susceptible to plastic deformation even if an excessive shock is exerted thereon.

Furthermore, the vibrating gyroscope according to the present invention has a reduced number of parts because it does not include a frame.

Furthermore, the vibrating gyroscope according to the present invention allows adjustment of the stiffness of the supporting members through coordination of the length of the bent portions provided in the second portions. Thus, the stiffness of the supporting members provided on the upper face of the vibrator and the stiffness of the supporting members provided on the lower face of the vibrator can be made equal, so that the vibrator is allowed to vibrate freely, serving to accurately determine angular velocity.

Furthermore, the vibrating gyroscope according to the present invention allows the vibrator to be fixed on the substrate for integration without using any upper lid, lower lid, or frame. Therefore, because the upper lid, lower lid, and frame are not included, the size of the overall vibrating gyroscope is reduced, the height is decreased, and the number of parts is reduced.

Furthermore, the vibrating gyroscope according to the present invention, in which the bottom face of the substrate is not electrically connected to any electronic component, can be used as a surface-mounted component by affixing a case on the substrate and providing through holes at the ends of the substrate.

Furthermore, the vibrating gyroscope according to the present invention, which has a metallic case, allows it to be smaller and allows shielding of the electronic components from external electromagnetic waves.

Furthermore, the vibrating gyroscope according to the present invention is smaller because no frame is included, so that the area on the substrate for mounting the components and for lands can be increased.

Furthermore, the electronic apparatus according to the present invention is of reduced cost and smaller size owing to a reduction in the number of parts and smaller size of the vibrating gyroscope.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
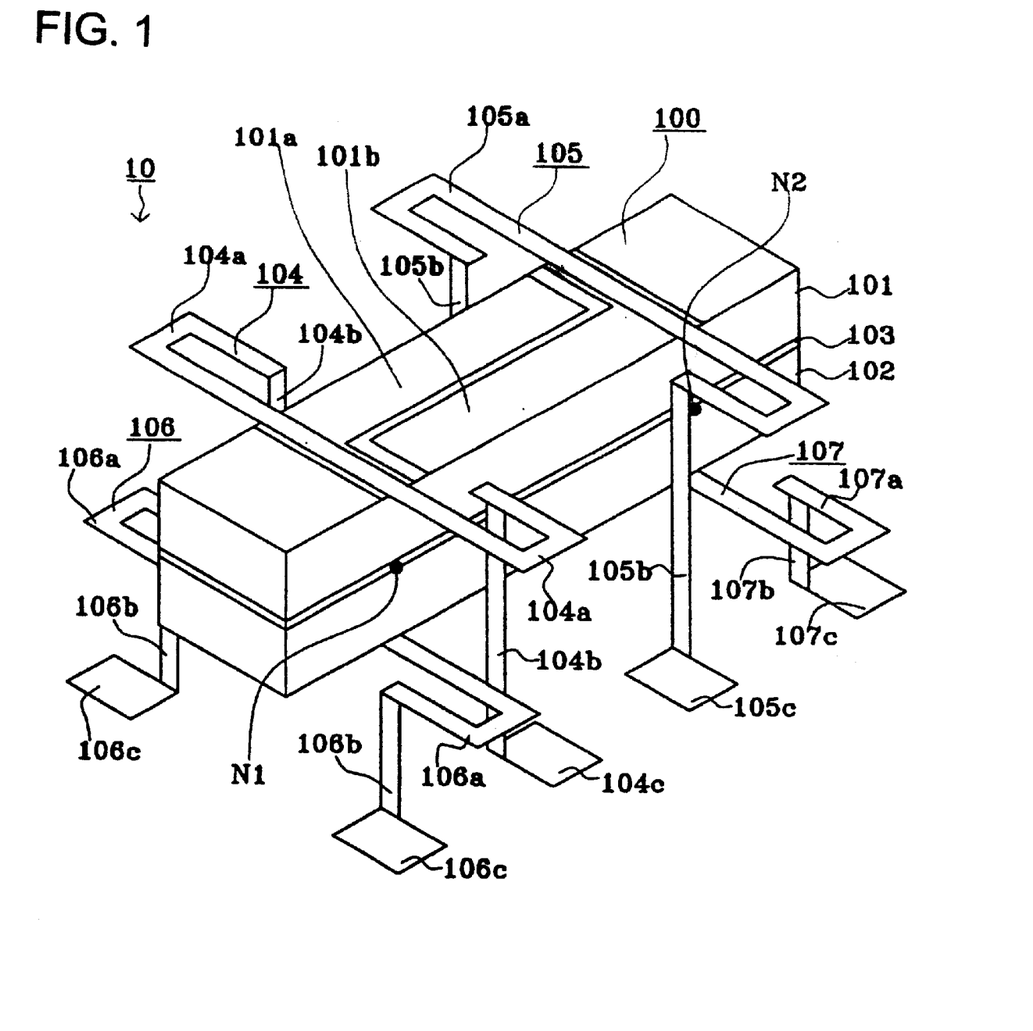
FIG. 1 is a perspective view of an embodiment of a vibrating gyroscope according to the present invention.
Figure 2:
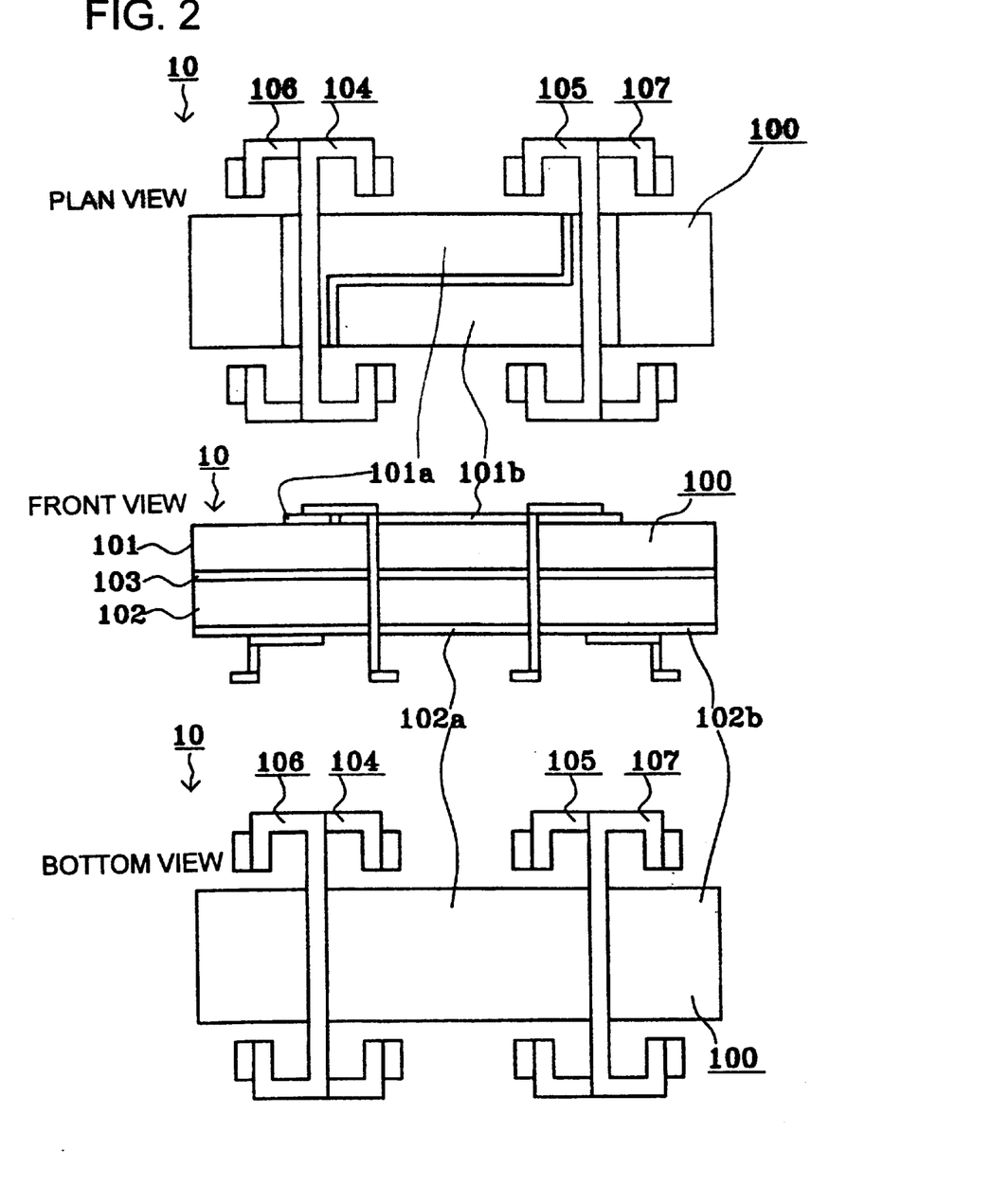
FIG. 2 shows a plan view, front view, and bottom view of the gyroscope in FIG. 1.

FIG. 1 shows a perspective view of an embodiment of a vibrating gyroscope according to the present invention, and FIG. 2 shows a plan view, a front view, and a bottom view thereof. In FIGS. 1 and 2, components which perform functions similar to those in the vibrating gyroscopes 80 and 90 shown in FIGS. 10 and 11 are indicated by the same reference characters, and description thereof is omitted.

Referring to FIGS. 1 and 2, a vibrating gyroscope 10 includes a vibrator 100, a substrate (not shown), and supporting members 104, 105, 106, and 107. The supporting members 104, 105, 106, and 107, respectively, are composed of a hard elastic material, such as metal, and include, on the planes where first principal planes of piezoelectric substrates 101 and 102 are formed, first portions 104a, 105a, 106a, and 107a extending in the width direction of the vibrator 100 away from the first principal planes of the piezoelectric substrates 101 and 102, and then are bent towards the vibrator 100, and second portions 104b, 105b, 106b, and 107b extending in the thickness direction of the vibrator 100 from the proximity of vibrator 100. The ends 104c, 105c, 106c, and 107c of the second portions 104b, 105b, 106b, and 107b are fixed to the substrate.

In the vibrating gyroscope 100 so constructed, a node point N1 of the vibrator 100 is supported by being sandwiched by the first portions 104a and 106a, and a node point N2 is supported by being sandwiched by the first portions 105a and 107a. Because the vibrator 100 is supported by being sandwiched by the first principal planes of the piezoelectric substrate 101 and the piezoelectric substrates 102, the vibrator 100 is not susceptible to problems such as falling off from the supporting members 104, 105, 106, and 107, without using a frame or thick supporting members, even if an excessive shock is exerted on the vibrating gyroscope 100.

The first portions 104a, 105a, 106a, and 107a of the vibrating gyroscope 100 extend in the width direction of the vibrator 100 on planes parallel to the first principal planes of the piezoelectric substrates 101 and 102, and are then bent in an L-shape in the longitudinal direction of the vibrator 100, thereby constituting a flexible structure which does not damp the vibration of the vibrator 100 with respect to the width direction. Accordingly, the vibration of the piezoelectric substrates 101 and 102 with respect to the width direction is inhibited from leaking from the supporting members 104, 105, 106, and 107; thus, the vibration of the vibrator 100 is inhibited from being attenuated.

Furthermore, in the vibrating gyroscope 10, in order to provide the second portions 104b and 105b in proximity to the vibrator 100, the first portions 104a and 105b extend in the width direction of the vibrator 100, and then are bent back in a U-shape. If an excessive shock in the width direction of the vibrator 100 is exerted on the vibrating gyroscope 10, the vibrator 100 bumps against the second portions 104b and 105b. Accordingly, excessive displacement of the vibrator 100 and plastic deformation of the supporting members 104, 105, 106, and 107 are prevented.

Furthermore, the vibrating gyroscope 10, in which no frame is included, has a reduced number of parts.

Figure 3:
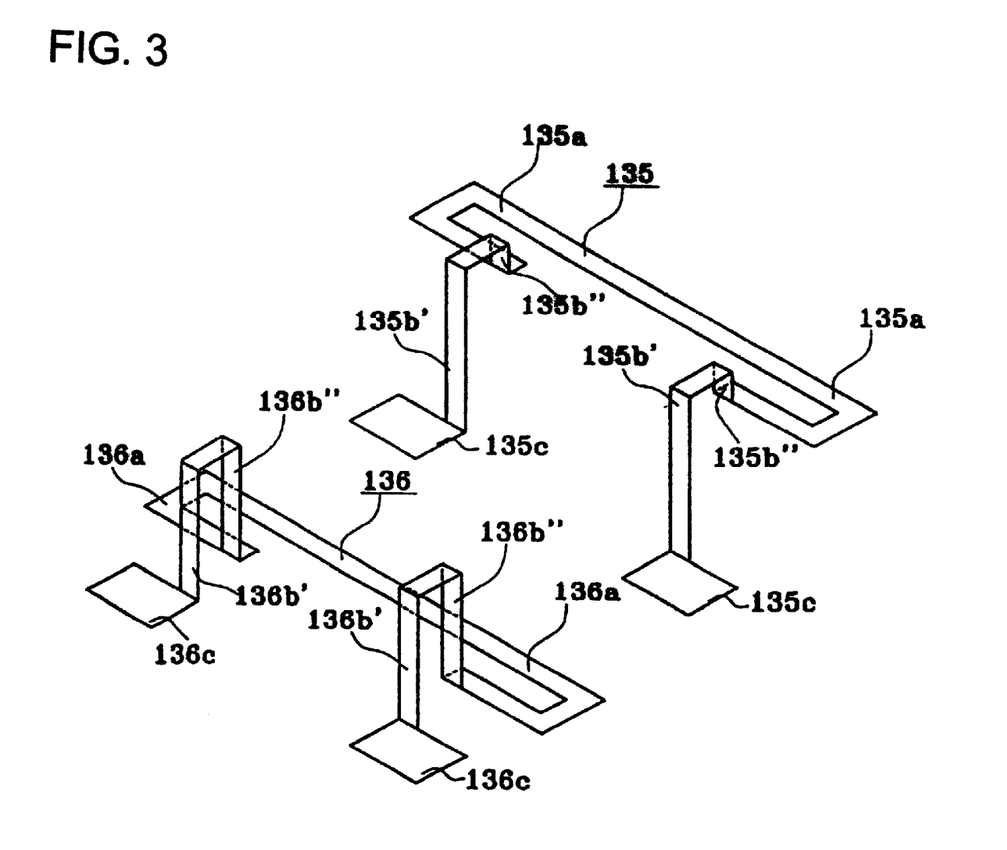
FIG. 3 is a perspective view of another embodiment of supporting members of the vibrating gyroscope in FIG. 1.

Next, FIG. 3 shows a perspective view of another embodiment of supporting members in the vibrating gyroscope according to the present invention.

FIG. 3 shows a supporting member 135 and a supporting member 136 corresponding respectively to the supporting member 105 and the supporting member 106 of the vibrating gyroscope shown in FIGS. 1 and 2.

Referring to FIG. 3, a second portion of the supporting member 135 includes bent portions 135b' and 135b'' bent back in the thickness direction of the vibrator 100, and a supporting member 134 (not shown) corresponding to the supporting member 104 also includes similar bent portions 134b' and 134b". A second portion of the supporting member 136 includes bent portions 136b' and 136b" bent back in the thickness direction of the vibrator 100, and a supporting member 137 (not shown) corresponding to the supporting member 107 also includes similar bent portions 137b' (not shown) and 137b" (not shown).

Generally, in fixing a vibrator on a substrate using supporting members, the stiffness of the vibrator with respect to the thickness direction becomes smaller as the distance between the substrate and the vibrator increases. Therefore, supporting members provided on the upper face of the vibrator have a smaller stiffness than supporting members provided on the lower face of the vibrator. When the stiffness of the supporting members varies as such depending on the distance from the substrate, the upper face and the lower face of the vibrator are supported in different conditions, inhibiting free vibration of the vibrator with respect to the thickness direction and also inhibiting accurate determination of angular velocity.

In the vibrating gyroscope constructed as shown in FIG. 3, the length of the bent portions 134b' and 134b" and the length of the bent portions 136b' and 136b" can be coordinated, and the length of the bent portions 135b' and 135b" and the length of the bent portions 137b' and 137b" can be coordinated, so that the stiffness of the vibrator 100 with respect to the thickness direction will be equivalent. Accordingly, by coordinating the bent portions as required, the supporting members 134 and 135 provided on the upper face of the vibrator 100 and the supporting members 136 and 137 provided on the lower face of the vibrator 100 can be made to have an equivalent stiffness with respect to the thickness direction of the vibrator 100.

It is equally advantageous to provide bent portions only in the supporting members 136 and 137 of the vibrating gyroscope.

Figure 4:
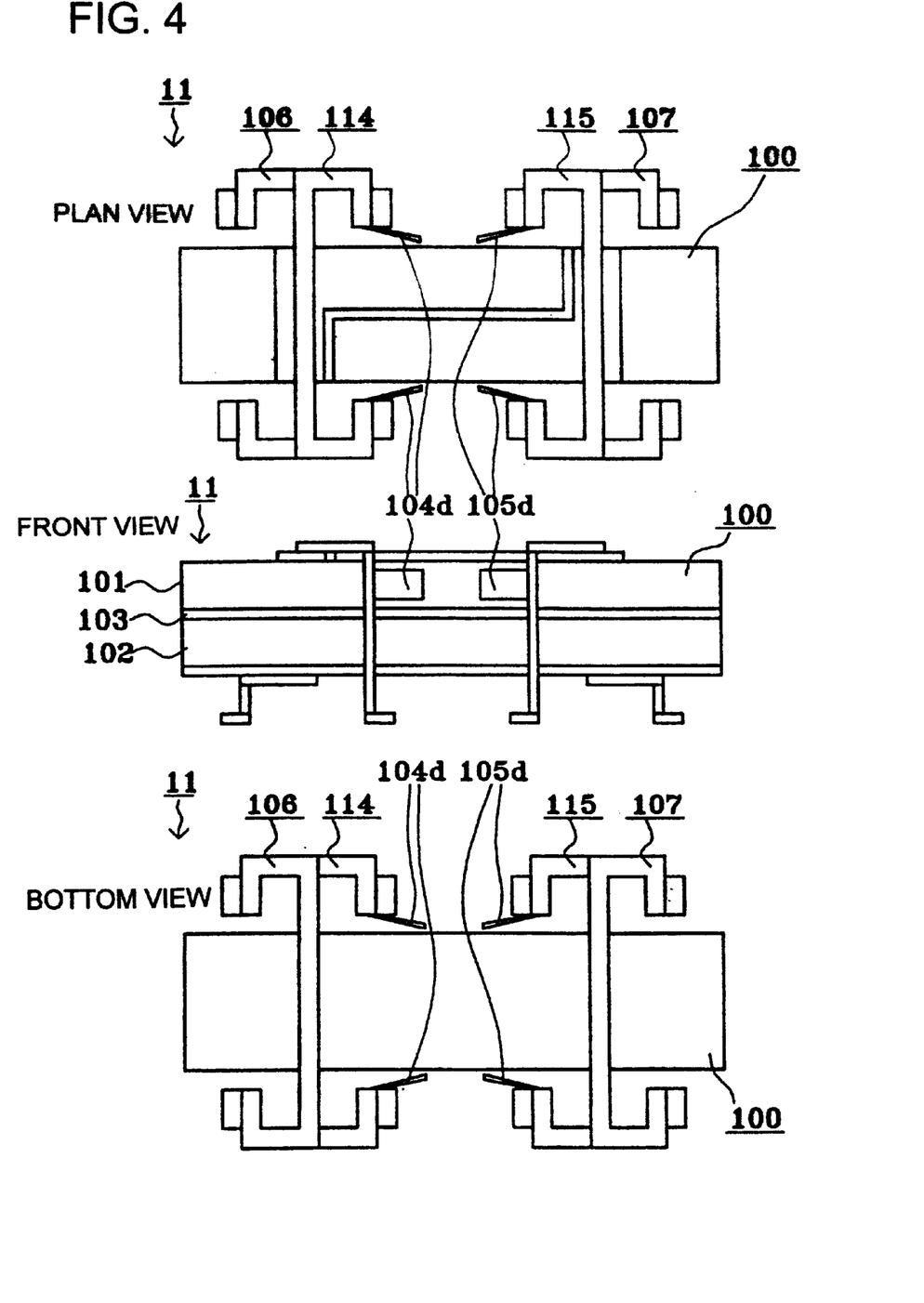
FIG. 4 shows a plan view, front view, and bottom view of another embodiment of a vibrating gyroscope according to the present invention.

Next, FIG. 4 shows a plan view, a front view, and a bottom view of another embodiment of a vibrating gyroscope according to the present invention. In FIG. 4, components identical to or equivalent to those in the vibrating gyroscope 10 shown in FIGS. 1 and 2 are indicated by the same reference characters, and description thereof is omitted.

Referring to FIG. 4, a vibrating gyroscope 11 includes supporting members 114 and 115 instead of the supporting members 104 and 105 of the vibrating gyroscope 10. The supporting members 114 and 115 includes projections 104d and 105d on second portions 114b and 115b. The projections 104d and 105d are provided toward the vibrator 100 with a slight tilt angle with respect to the longitudinal direction of the vibrator 100.

In the vibrating gyroscope so constructed, the projections 104d and 105d are provided in proximity to the vibrator 100 so that when an excessive shock is exerted on the vibrator 100, the projections 104d and 105d bump against the vibrator 100 so as to inhibit excessive displacement of the vibrator 100. Furthermore, in the vibrating gyroscope 11, the spacing between the vibrator 100 and the supporting members 114 and 115 can be finely controlled by adjusting the tilt angle of the projections 104d and 105d. It is equally advantageous to provide projections only on one of the supporting members 114 and 115.

Figure 5:
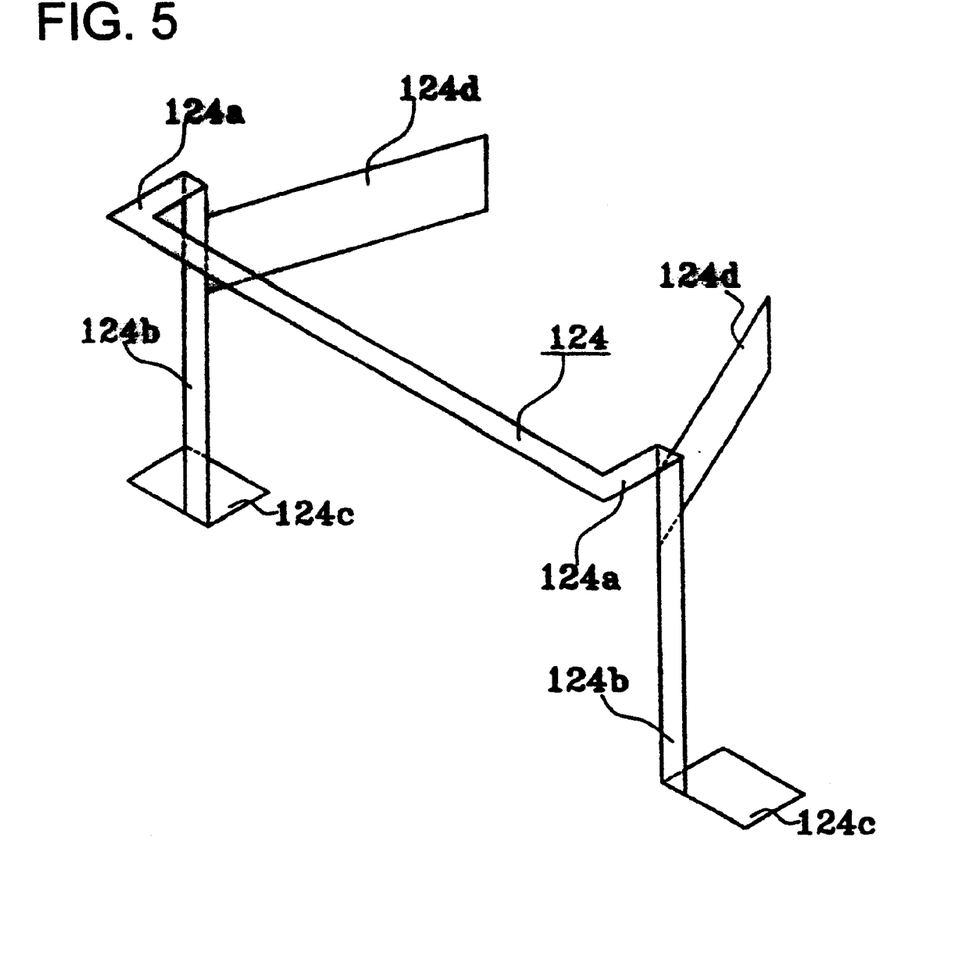
FIG. 5 is a perspective view of another embodiment of supporting members of the vibrating gyroscope in FIG. 4.

Next, FIG. 5 is a perspective view of yet another embodiment of supporting members in the vibrating gyroscope according to the present invention. FIG. 5 only shows a supporting member 124 corresponding to the supporting member 104 of the vibrating gyroscope shown in FIGS. 1 and 2.

Referring to FIG. 5, the supporting member 124 includes projections 124d on second portions 124b away from the proximity of the vibrator 100, and a supporting member 125 (not shown) corresponding to the supporting member 105 also includes similar projections 125d (not shown). Similarly to the projections 104d and 105d, the projections 124d and 125d are provided toward the vibrator 100 with a slight tilt angle with respect to the longitudinal direction of the vibrator 100.

When the supporting member 124 includes such projections 124d, it may be formed so that the second portion 124b is away from the proximity of the vibrator 100 while only the projection 124d is in proximity to the vibrator 100. It is equally advantageous to provide the projections 125d on the supporting member 125.

Figure 6:
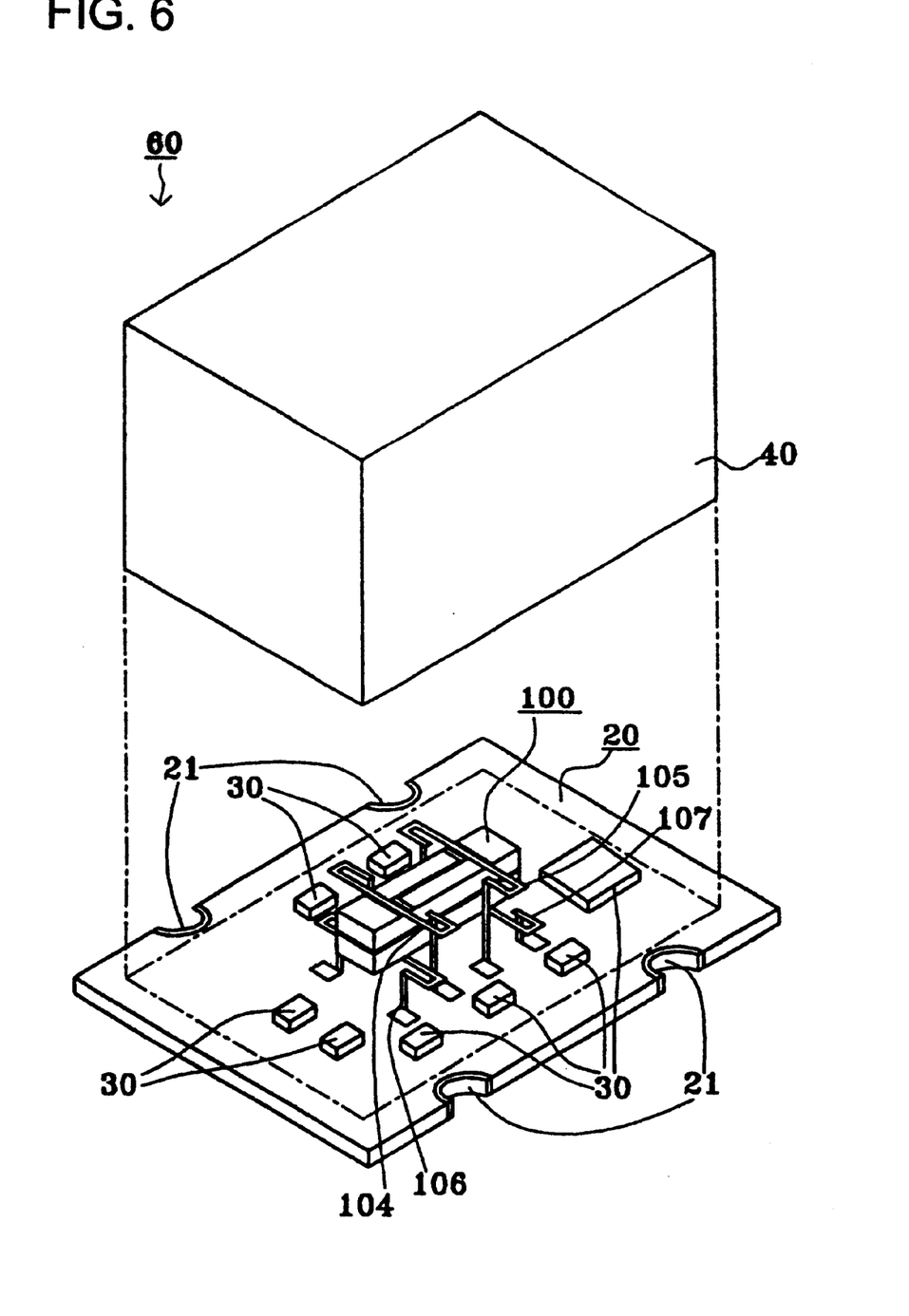
FIG. 6 is a perspective view of yet another embodiment of a vibrating gyroscope according to the present invention.

Next, FIG. 6 shows a perspective view of yet another embodiment of a vibrating gyroscope according to the present invention. In FIG. 6, components identical to or equivalent to those in the vibrating gyroscope 10 shown in FIGS. 1 and 2 are indicated by the same reference characters, and description thereof is omitted.

Referring to FIG. 6, a vibrating gyroscope 60 includes a substrate 20 (not shown in FIG. 1), electronic components 30, and a case 40. The substrate 20 has through holes 21 at the ends thereof, and a vibrator 100 and the electronic components are mounted only on the top face thereof. The electronic components 30 are required for driving the vibrator 100 or for determining angular velocity. The case 40 is fixed on the top face of the substrate 20 so as to cover the vibrator 100 and the electronic components 30.

In the vibrating gyroscope 60 so constructed, the supporting members 104, 105, 106, and 107 are used instead of using an upper lid, a lower lid, and a frame, in order to affix the vibrator 100 to the substrate 20 integrally, and the substrate 20 and the case 40 seal the electronic components 30 so as to electrically shield the electronic components 30 from the outside. Furthermore, because no upper lid, lower lid, and frame is included, the overall size of the vibrating gyroscope 60 is reduced, the height is decreased, and the number of parts is reduced.

In particular, the vibrator 100 and the electronic components 30 are mounted only on the top face of the substrate 20, and the bottom face of the substrate 20 is not electrically connected to the electronic components 30. Thus, the vibrating gyroscope 60, by providing the through holes 21 at the ends of the substrate 20, can be used as a surface-mounted component which is directly mountable on an external circuit pattern.

Furthermore, if the case 40 of the vibrating gyroscope 60 is a metallic case, it is thinner than a resin case; thus, it serves to reduce the overall size of the vibrating gyroscope 60 while also shielding the electronic components 30 from external electromagnetic waves. Furthermore, by making the case 40 thinner, the case occupies a smaller area on the substrate 20, allowing for a larger area for mounting the components and for the lands.

Figure 7:
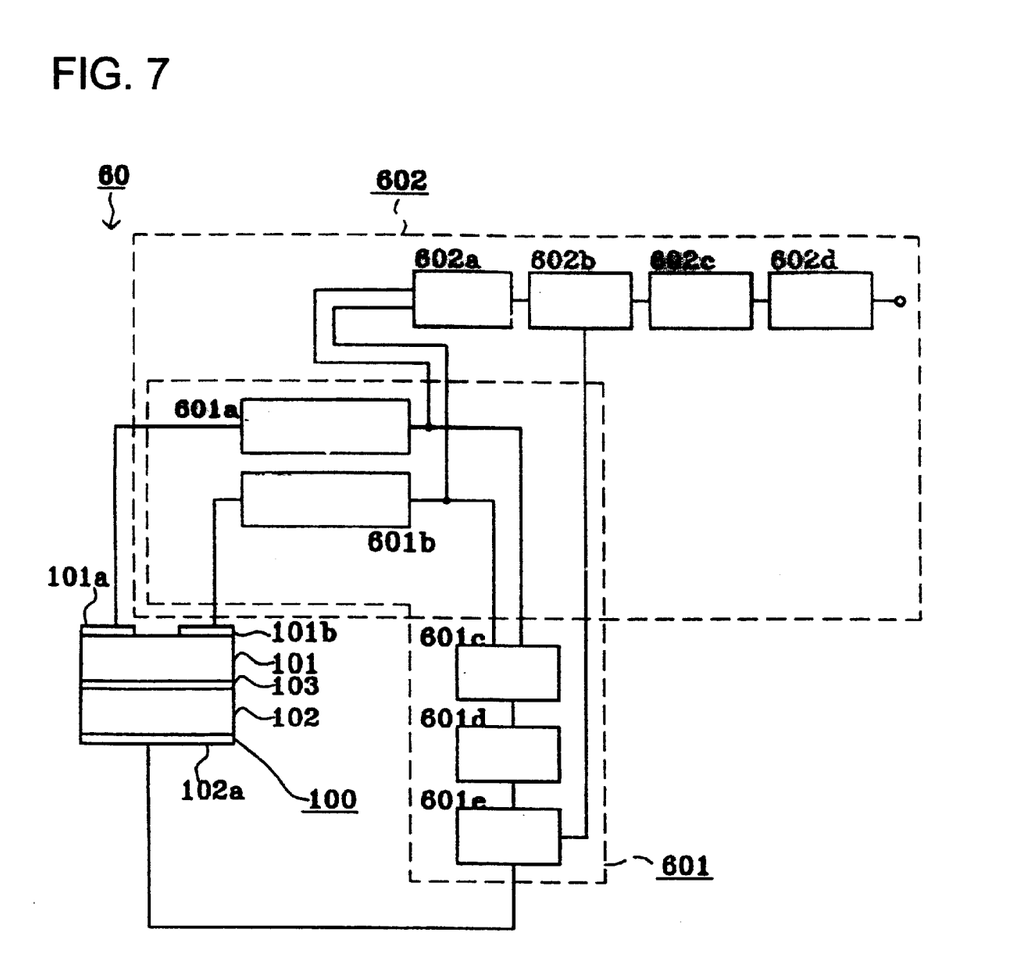
FIG. 7 is a block diagram of the embodiment of a vibrating gyroscope in FIG. 6.

Next, FIG. 7 shows a block diagram of a vibrating gyroscope according to the present invention. FIG. 7 is a block diagram of the vibrating gyroscope 60 shown in FIG. 6, incorporating the electronic components 30, and includes an oscillation circuit 601 as a driving means, and a detection circuit 602 as a detecting means. The oscillation circuit 60 includes a first charge amplifier 601a, second charge amplifier 601*b*, an adder circuit 601*c*, an AGC circuit 601*d*, and a phase compensation circuit 601*e*, and the detecting circuit 602 includes the first charge amplifier 601*a*, the second charge amplifier 601*b*, a differential circuit 602*a*, a detector circuit 602*b*, a smoothing circuit 602*c*, and an amplifier circuit 602*d*.

A first detecting electrode 101*a* of the vibrator 100 is connected to the first charge amplifier 601*a*, and a second detecting electrode 101*b* is connected to the second charge amplifier 601*b*. The first charge amplifier 601*a* and the second charge amplifier 601*b* are respectively connected to the adder circuit 601*c* and to the differential circuit 602*a*. The adder circuit 601*c* is connected to the AGC circuit 601*d*, the AGC circuit 601*d* is connected to the phase compensation circuit 601*e*, and the phase compensation circuit 601*e* is connected to the detector circuit 602*b* and to a driving electrode 102*a*. The differential circuit 602*a* is connected to the detector circuit 602*b*, the detector circuit 602*b* is connected to the smoothing circuit 602*c*, and the smoothing circuit 602*c* is connected to the amplifier circuit 602*d*.

In the vibrating gyroscope 60 according to the present invention so constructed, the first charge amplifier 601*a* converts the charge generated at the detecting electrode 101*a* into a voltage and outputs to the adder circuit 601*c* and to the differential circuit 602*a*, the second charge amplifier 601*b* converts the charge generated at the second detecting electrode 101*b* into a voltage and outputs to the adder circuit 601*c* and to the differential circuit 602*a*. The adder circuit 601*c* takes the sum of the input signals and outputs to the AGC circuit 601*d*, the AGC circuit 601*d* amplifies the input signal to a constant amplitude and outputs to the phase compensation circuit 601*e*, and the phase compensation circuit 601*e* compensates the phase of the input signal and applies a driving signal to the driving electrode 102*a*.

The differential circuit 602*a* takes the difference of the input signals and outputs to the detector circuit 602*b*, the detector circuit 602*b* detects, in accordance with the signals input from the phase compensation circuit 601*e*, the signal input from the differential circuit 602*a*, and outputs to the smoothing circuit 602*c*, and the amplifier circuit 602*d* DC-amplifies the input signal outputs to the outside.

In the vibrating gyroscope 60 so constructed, when the driving signal is applied to the driving electrode 102*a*, the vibrator 100 causes a longitudinal-bar flexural oscillation in the thickness direction, in which the nodes in the lowest mode are node points N1 and N2. When an angular velocity, for which the longitudinal direction is the axis, is applied to the vibrator 100, a flexural displacement is generated in the width direction due to the Coriolis force, so that the angular velocity is determined based on the difference between the signals from the first detecting electrode 101*a* and from the second detecting electrode 101*b*. Furthermore, based on the sum of the signals from the first detecting electrode 101*a* and from the second detecting electrode 101*b*, a signal is detected which corresponds to a flexural displacement in the width direction of the vibrator 100, which is not influenced by the Coriolis force.

Thus, the vibrating gyroscope according to the present invention, internally having the oscillation circuit 601 and the detection circuit 602 required for determining angular velocity, serves to constitute an integrated vibrating gyroscope unit.

Figure 8:
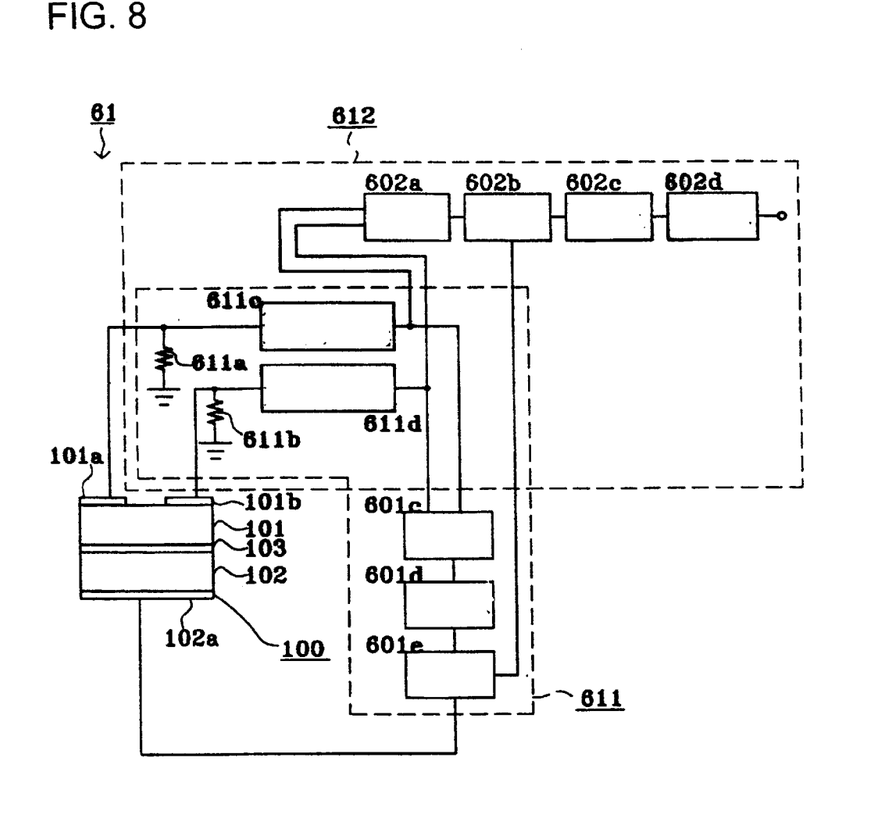
FIG. 8 is a perspective view of yet another embodiment of a vibrating gyroscope according to the present invention.

Next, FIG. 8 shows yet another embodiment of a vibrating gyroscope according to the present invention. In FIG. 8, components identical to or equivalent to those in the vibrating gyroscope 60 shown in FIG. 7 are indicated by the same reference characters, and description thereof is omitted.

Referring to FIG. 8, a vibrating gyroscope 61 according to the present invention includes an oscillation circuit 611 and a detection circuit 612 instead of the oscillation circuit 601 and the detection circuit 602 of the vibrating gyroscope 60 shown in FIG. 7. The oscillation circuit 611 and the detection circuit 612 only differ from the oscillation circuit 601 and the detection circuit 602 in that resistors 611*a* and 611*b*, a first buffer circuit 611*c*, and a second buffer circuit 611*d* are included instead of the first charge amplifier 601*a* and the second charge amplifier 601*b* shown in FIG. 8.

In this vibrating gyroscope, the resistor 611*a* and the first buffer circuit 611*c* are connected to a first detecting electrode 101*a*, and the resistor 611*b* and the second buffer circuit 611*d* are connected to a second detecting electrode 101*b*. The first buffer circuit 611*c* and the second buffer circuit 611*d* are connected to an adder circuit 601*c* and a differential circuit 602*a*. The first buffer circuit 611*c* is provided for outputting a voltage at the first detecting electrode 101*a* to the adder circuit 601*c* and the differential circuit 602*a*, the second buffer circuit is provided for outputting a voltage at the second detecting electrode 101*b* to the adder circuit 601*c* and the differential circuit 602*a*, and the resistors 611*a* and 611*b* are provided for adjusting the impedance of the first detecting electrode 101*a* and the second detecting electrode 101*b*.

The vibrating gyroscope 61 according to the present invention so constructed is equally advantageous as the vibrating gyroscope 60 shown in FIG. 7.

Figure 9:
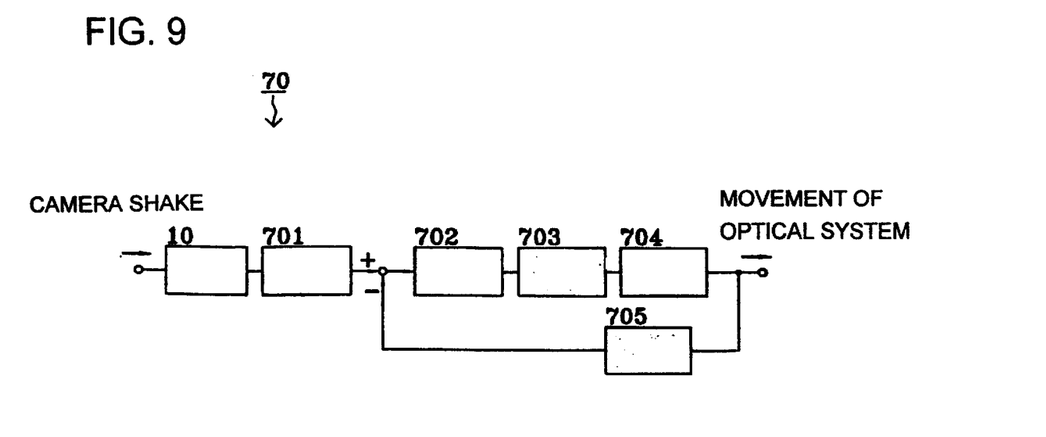
FIG. 9 is a block diagram of an embodiment of an image stabilization circuit incorporated in an electronic apparatus, according to the present invention.

Next, FIG. 9 shows an embodiment of an electronic apparatus incorporating a vibrating gyroscope according to the present invention. FIG. 9 is a block diagram of an image stabilization circuit incorporated in a video camera as the electronic apparatus according to the present invention. An image stabilization circuit 70 includes a vibrating gyroscope 10 according to the present invention, an integrator circuit 701, a servo circuit 702, a current driver 703, an actuator 704, and a position sensor 705. In the image stabilization circuit 70, the vibrating gyroscope 10, the integrator circuit 701, the servo circuit 702, the current driver 703, and the actuator 704 are connected in series, and the output of the actuator 704 is fed back to the servo circuit 702 via the position sensor 705.

In the image stabilization circuit 70 so constructed, with regard to shaking exerted on the video camera, only the angular velocity signal is input from the vibrating gyroscope 10 to the integrator circuit 701, the integrator circuit 701 integrates the angular velocity signal, converts into an angle of deviation of the video camera, and outputs to the servo circuit 702, the servo circuit 702 uses deviation angle signals input from the integrator circuit 701 and from the position sensor 705 to calculate the difference between the current value and the target value, and outputs to the current driver 703, the current driver 703 outputs to the actuator 704 a current in accordance with the input signal, and the actuator 704 mechanically drives an optical system of the video camera. The position sensor 705 outputs to the servo circuit 702 the deviation angle due to the movement of the optical system.

The video camera incorporating the image stabilization circuit 70 so constructed, having the vibrating gyroscope which allows accurate determination of angular velocity, accurately compensates for the effects of shaking exerted on the video camera.

Although the electronic apparatus according to the present invention has been described hereinabove in the context of a video camera, it is obvious that the electronic apparatus according to the present invention is not limited to the video camera so constructed.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:

a substrate;

a vibrator; and at least first and second pairs of supporting members, the supporting members of each pair being substantially opposite to one another and being fixed on opposite principal planes of said vibrator in proximity to a node point of said vibrator, wherein said supporting members comprise first portions extending from said substrate in a direction parallel to said substrate from the principal planes of said vibrator, and second portions extending in a direction orthogonal to said substrate, said second portions being fixed to said substrate.

2. A vibrating gyroscope according to claim 1, wherein said second portions are disposed in proximity to said vibrator, and wherein said second portions inhibit excessive displacement of said vibrator when said vibrator is excessively displaced.

3. A vibrating gyroscope according to claim 1, wherein said second portions comprise projections, said projections are disposed in proximity to said vibrator, and wherein said projections inhibit excessive displacement of said vibrator when said vibrator is excessively displaced.

4. A vibrating gyroscope according to claim 1, wherein each of the supporting members has a stiffness and each of the second portions has a length and the lengths of each of the second portions is selected such that the respective stiffnesses of the supporting members are substantially equal.

5. A vibrating gyroscope according to any one of claims 1 to 4, wherein said second portions comprise bent portions bent back in a direction orthogonal to said substrate.

6. A vibrating gyroscope according to any one of claims 1 to 4, wherein said supporting members are composed of a hard elastic material.

7. A vibrating gyroscope according to any one of claims 1 to 4, comprising driving means for vibrating said vibrator, and detecting means for detecting an output generated by said vibrator.

8. A vibrating gyroscope according to any one of claims 1 to 4, wherein electronic components are mounted on said substrate only on a face of said substrate on which said vibrator is mounted, and wherein a case is affixed to said substrate so as to cover said vibrator and said electronic components.

9. A vibrating gyroscope according to claim 7, wherein electronic components are mounted on said substrate only on a face of said substrate on which said vibrator is mounted, and wherein a case is affixed to said subsrate so as to cover said vibrator and said electronic componets.

10. A vibrating gyroscope according to any one of claims 1 to 4, wherein said substrate comprises through holes at ends of said substrate.

11. An electronic apparatus comprising a vibrating gyroscope according to any one of claims 1 to 4.

12. An electronic apparatus comprising a vibrating gyroscope according to claim 7.

13. An electronic apparatus comprising a vibrating gyroscope according to claim 8.

14. An electronic apparatus comprising a vibrating gyroscope according to claim 9.

* * * * *